May 5, 1931. C. E. CARPENTER 1,803,838
ERADICATION OF QUACK GRASS AND THE LIKE
Filed Oct. 11, 1929   2 Sheets-Sheet 1
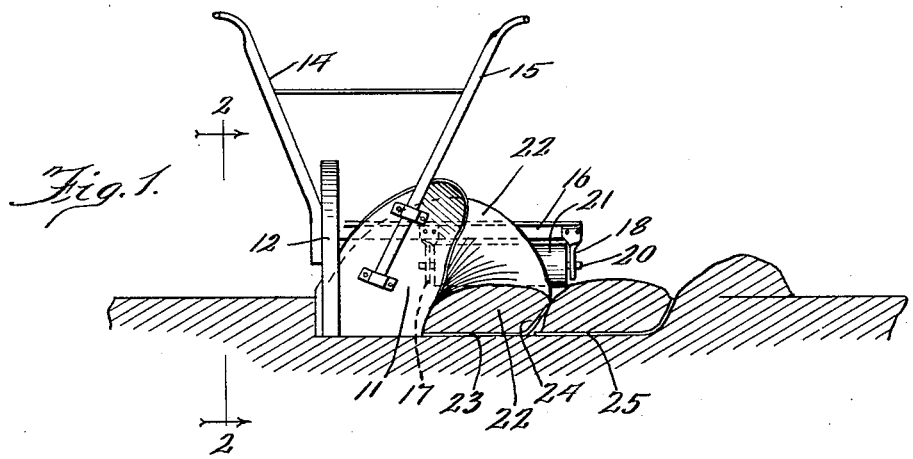
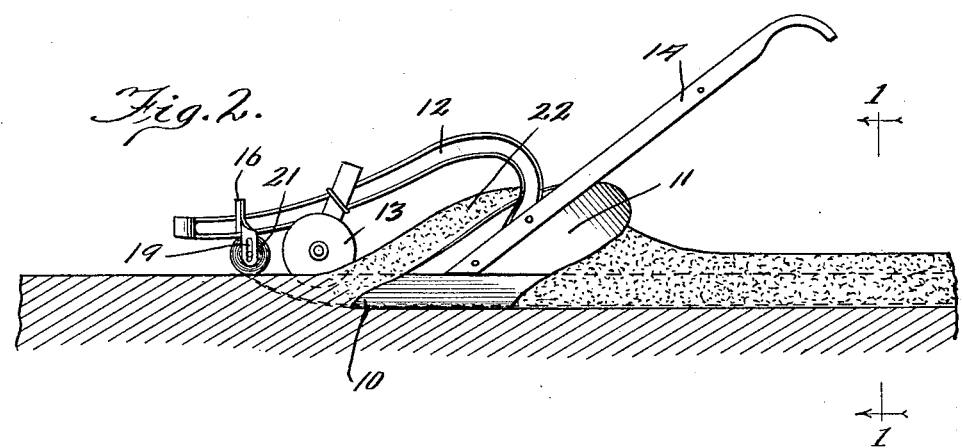
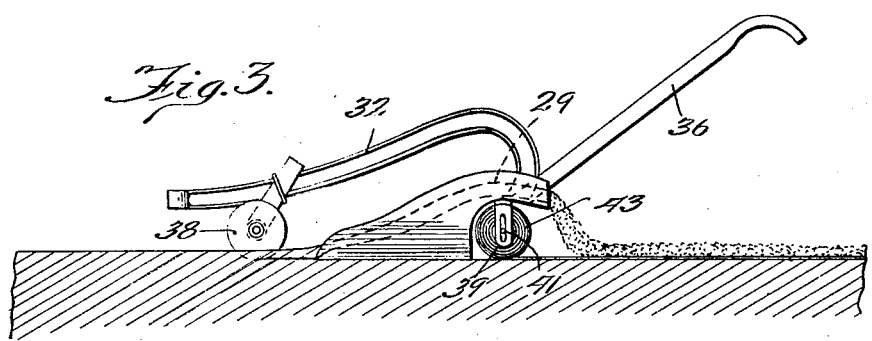
Inventor:
Charles E. Carpenter May 5, 1931.  C. E. CARPENTER  1,803,838
ERADICATION OF QUACK GRASS AND THE LIKE
Filed Oct. 11, 1929  2 Sheets-Sheet 2

Inventor:
Charles E. Carpenter
By Thos. A. Dampf
Atty.

Patented May 5, 1931

1,803,838

UNITED STATES PATENT OFFICE

CHARLES E. CARPENTER, OF CHICAGO, ILLINOIS

ERADICATION OF QUACK GRASS AND THE LIKE

Application filed October 11, 1929. Serial No. 398,967.

It is well known that quack grass is a serious obstruction to the cultivation and development of farming operations, and that the presence of quack grass substantially destroys the usability of the ground in which it is growing. It is customary and practically necessary for farmers to confine their planting and cultivating activities to sections which are free of this nuisance. To this end it has been customary in the past for the farmer to cultivate the farm around the quack grass areas, recognizing that until the quack grass is either destroyed or eliminated, the ground on which the grass is growing is utterly useless for the raising of crops.

There have, in the past, been proposed certain systems or methods of eliminating the quack grass. Thus, for example, it has been proposed and in some instances practiced, to treat the soil in which the quack grass is growing with a saline solution. However, the use of a sufficiently strong solution to accomplish the object of destroying the quack grass also renders the soil useless for general cultivation until the salt has been sufficiently washed out of the soil after the lapse of considerable time.

It has also been proposed to accomplish the elimination of the quack grass by treatment of the soil with suitable chemicals but this in its turn is expensive and objectionable for other reasons.

I propose to treat the soil in such a manner as to kill the quack grass by making the same dry up or burn up in the weather by preventing a proper supply of moisture and also by preventing access of sufficient oxygen to the quack grass plants, so as to result in their destruction. For the above purposes I propose to plow or shear a relatively thin layer in the surface of the soil and either turn the same over and redeposit it wrong side up either in the same or the adjacent furrow; or else redeposit it right side up in the same furrow from which it was cut. In either case, however, I propose to lay down a layer of suitable paper in the furrow prior to deposit of the soil therein, so that the soil redeposited in the furrow is isolated from the soil beneath by such layer of paper or the like. The paper will be of any suitable mat, such as a fairly heavy wrapping paper; and preferably either more or less waterproof. For example, the paper may be paraffined or oiled.

Preferably the layer of soil sheared off as above is relatively thin, for example 1½-2 inches in thickness. I do not intend to restrict myself, however, to any particular thickness of such layer.

The operation is preferably performed during the dry season or at the beginning of the dry season, although considerable benefit will also be procured by treatment at other seasons.

The results of the foregoing treatments are as follows:

The soil below the paper layer is more or less completely and effectively cut off from contact with the oxygen of the air so that the roots below the paper are unable to maintain their vitality and they soon die out. Those portions of the quack grass plants in the soil above the paper are effectively prevented from receiving moisture from the soil beneath, for which they are effectively insulated from the soil by the paper layer. Consequently, those plant portions above the paper dry out and also starve so that they are so destroyed.

By the foregoing treatment the nitrifying bacteria and other life and nourishment giving elements of the soil are not in any way injured or lessened, and as a result of this circumstance the soil is in perfect condition for cultivation and planting to any desired crop when a reasonable time has expired, for example one season after the paper layer treatment.

Furthermore, it will be readily appreciated that after the lapse of sufficient time the paper will naturally become more or less disintegrated, this being particularly true after the wet season has progressed. Consequently, when the time arrives for plowing and cultivating the soil the presence of the paper will be unobjectionable and the soil cultivation will simply serve to more completely break up and fully disintegrate the paper fibers. Their presence in the soil will thereafter be unobjectionable and in fact they will eventually rot out and to that extent accomplish a fertilizing function.

It is also preferred that in laying the strips or sections of paper into the ground the edge portions thereof should be overlapped so as to more perfectly seal off the soil beneath.

In the drawings I have illustrated certain forms of plow construction and attachments therefor capable of practicing the present invention.

In the drawings:

Figure 1 shows a cross section through the ground at a position behind the plow, the plow being of familiar construction for turning over the soil and depositing it upside down in the adjacent furrow, and the plow being provided with an attachment for spreading the layer of paper in the previously opened furrow and directly in advance of the soil which is deposited therein; Figure 1 may also be considered as a section taken on the line 1—1 of Figure 2, looking in the direction of the arrows;

Figure 2 is a side view corresponding to Figure 1 and may also be considered as a section on the line 2—2 of Figure 1, looking in the direction of the arrows;

Figure 3 shows a view similar to that of Figure 2, but illustrates a modified form of construction in which the soil is sliced from the surface and is then deposited back in the same furrow without overturning, the paper layer having been laid back into the same furrow prior to the restoration of the soil thereinto;

Figure 4:
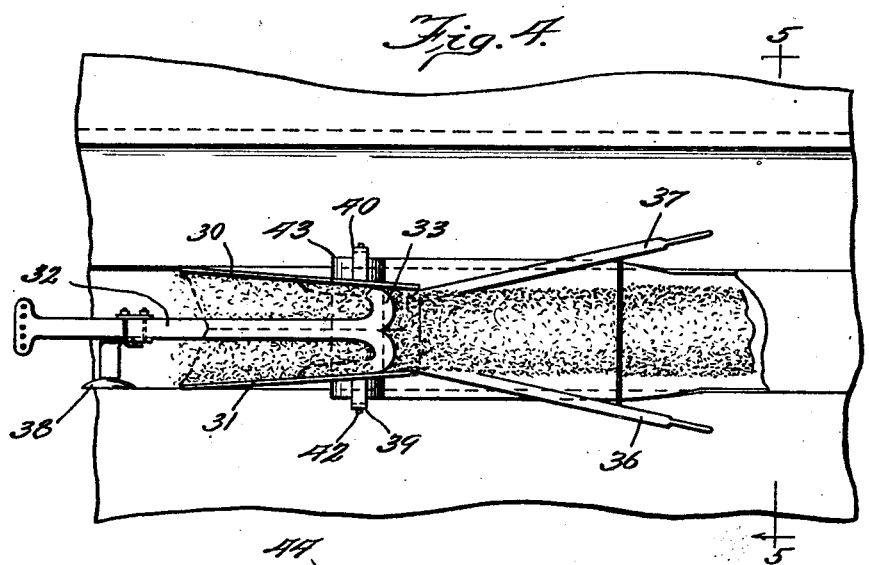
Figure 4 shows a plan view corresponding to Figure 3.

Referring first to the construction shown in Figure 1, the same includes a plow including the plow-point 10 of familiar construction and also including the moldboard 11 by means of which the soil is taken up and turned over and redeposited in the previously cut furrow. This plow is also shown as being provided with the usual beam 12, which reaches forwardly and in its forward portion is provided with a colter wheel or disk 13 which shears the soil at the land side of the newly cut furrow in accordance with usual practice. The handles 14 and 15 are provided, one being connected to the beam 12 and the other to the moldboard in the usual manner.

At the front end of the beam 12 I provide a sidewise projecting bracket 16 which reaches over far enough to travel above the previously cut furrow as will be clearly evident from Figure 1. This bracket is provided with the downwardly reaching hangers which are numbered 17 and 18 and which are preferably vertically slotted as shown at 19 in Figure 2, to receive the ends of a pin 20 on which pin is carried the roll of paper 21. This paper roll is allowed to ride on the floor of the previously cut furrow and thus lay the paper directly on said floor and at a position in advance of the soil which is being turned over and delivered into the furrow from the newly cut furrow. Thus, from examination of Figure 2, it will be evident that the paper roll 21 occupies a position well in advance of the plow point 10, so that the soil 22 being turned over and delivered into the previously cut furrow is deposited down on the layer of paper after said paper has been set into the bottom of the furrow.

It will also be noted that the bracket 17 travels along a line close to the edge of the previously cut furrow whereas the bracket 18 travels over along a line somewhat beyond the farther edge of the previously cut furrow. As a result the paper layer is laid with one edge close to or abutting against or slightly up along the edges of the previously cut furrow. Thus for example, in Fig. 1, the paper layer 23 has its left edge substantially at the left edge of the previously cut furrow and has its right edge 24 somewhat overlapping the left edge of the previously placed paper layer 25. As a consequence the consecutive layers of paper slightly overlap each other and thus bring about a better seal between the consecutive furrows.

Figure 5:
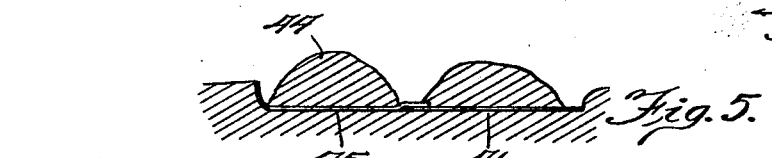
Figure 5 shows a cross section through a series of furrows formed by the arrangement of Figures 3 and 4, and Figure 5 may be considered as a fragmentary section on the line 5—5 of Figure 4, looking in the direction of the arrows.
Figure 6:
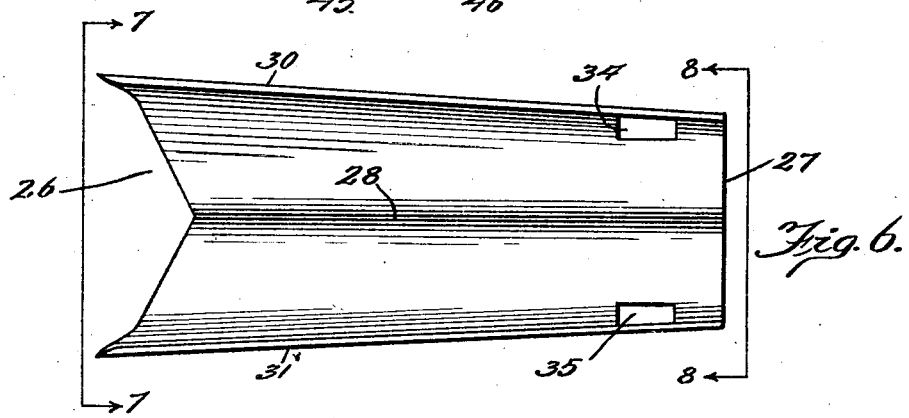
Figure 6 shows a plan view of the moldboard of the arrangement of Figures 3 and 4.
Figure 7:
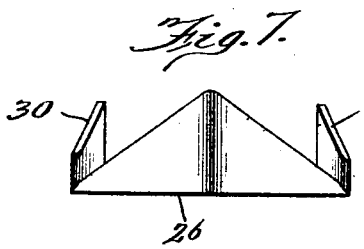
Figure 7 shows an end view at the leading end of the moldboard of Figure 6.
Figure 8:
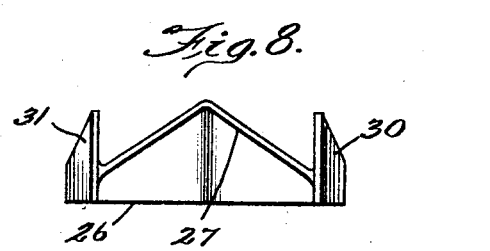
Figure 8 shows an end view of the moldboard at the trailing end of the arrangement of Figure 6.

Referring next to the construction shown in Figures 3 to 8 inclusive, in this case the plow is of special and peculiar form as shown in detail in Figures 6, 7, and 8. Its front shearing edge 26 is of the full width of the furrow, whereas its rear redepositing edge 27 is preferably of constricted width. The plow is also centrally raised throughout its length as shown at 28, and the plow reaches upwards on a gradual slant to a high point 29 (see Fig. 3) back of which it descends somewhat. The sides of the plow are also provided with flanges 30 and 31 so that the soil is guided as it travels rearwardly over the plow and is prevented from falling off from the sides thereof.

The result is that as this plow is drawn forwards through the ground the soil is sheared off to the proper depth and is then carried upwards and somewhat contracted in width and is finally redeposited over the rear edge of the plow, back into the same furrow, right side up. This plow is also preferably drawn forward by the beam 32 to the front end of which the team or tractor is connected.

The rear portion of said beam is forked as shown at 33 in Figure 4, the forks thereof being carried down through openings 34 and 35 in the plow and connected to the under side thereof. Suitable handles 36 and 37 are also provided, the same being attached to the rear portion of the plow. There is also illustrated a coulter wheel 38 connected to the front portion of the beam 32 for shearing the newly cut furrow at the land side thereof.

In the present case there is a pair of brackets 39 and 40 which reach downwardly from the plow or from the handles 36 and 37 at the highest point of the plow, said brackets being slotted as shown at 41 to receive the end portions of the rod 42 upon which the roll of paper therefor travels beneath the highest point of the plow where it is best accommodated. The slots 41 allow the paper roll to travel directly on the surface of the furrow.

Examination of Figure 5 will show that the soil delivered over the rear end of the plow is somewhat banked or humped up as shown at 44. The paper layer 45 is of the full width of the newly cut furrow so replaced soil does not fully occupy the entire width of said paper layer. Consequently, the next furrow may be so cut as to allow its paper layer 46 to lap slightly over the exposed edge of the paper layer 45, thus giving the desired lap of the consecutive strips of paper. If desired, the replaced soil may be smoothed out by the application of any suitable implement either directly attached to the plow or trailing after it or as a separate operation.

While I have herein shown and described only certain structures capable of practicing the features of the present invention, still I do not intend to limit myself thereto except as I may do so in the claims.

I claim:

1. A method of eradication of quack grass and the like from soil, which consists in shearing the upper layer of soil from the ground to thereby sever the plants of quack grass or the like from their roots, and thereafter restoring said layer of soil to the ground with a layer of paper in place between the ground and said layer of soil, whereby delivery of moisture from the ground upwardly to said layer of soil and delivery of oxygen downwardly to the ground below said layer of soil is prevented with consequent destruction of the plants and roots, substantially as described.

2. A method of eradication of quack grass and the like from soil which consists in isolating a relatively thin layer of soil at the top of the ground from the ground beneath it by the use of a substantially impervious layer of fibrous material, to thereby discontinue supply of moisture from the body of the ground upwardly to plants in said layer of soil and at the same time discontinue the supply of oxygen downwardly to the roots in the ground beneath said layer of soil, substantially as described.

3. A method for the eradication of quack grass and the like from the soil which consists in introducing a layer of substantially impervious fibrous material between a relatively thin layer of soil at the top of the ground and the ground beneath the same during the dry season and leaving said impervious layer in place, whereby exchange of moisture from the ground beneath into the soil above said impervious layer and oxygen from above into the ground beneath said impervious layer is substantially interrupted with consequent destruction of the plants and roots in the soil and ground, substantially as described.

CHARLES E. CARPENTER.